US007212834B2

(12) United States Patent
Hsu et al.

(10) Patent No.: US 7,212,834 B2
(45) Date of Patent: May 1, 2007

(54) MOBILE DEVICE HAVING AN IMPROVED ROLLER FEEL

(75) Inventors: Chien-Yu Hsu, Gueishan Township, Taoyuan County (TW); Chang-Yi Li, Gueishan Township, Taoyuan County (TW); Li-Sen Chen, Gueishan Township, Taoyuan County (TW)

(73) Assignee: Speed Tech Corp., Taoyuan County (TW)

( * ) Notice: Subject to any disclaimer, the term of this patent is extended or adjusted under 35 U.S.C. 154(b) by 69 days.

(21) Appl. No.: 10/920,302

(22) Filed: Aug. 18, 2004

(65) Prior Publication Data

US 2006/0037847 A1 Feb. 23, 2006

(51) Int. Cl.
*H04M 1/00* (2006.01)

(52) U.S. Cl. .................................... 455/550; 455/575.1

(58) Field of Classification Search ............ 455/550.1, 455/556; 492/30, 42, 48; 710/5, 11; 200/240, 200/247

See application file for complete search history.

(56) References Cited

U.S. PATENT DOCUMENTS 6,097,964 A * 8/2000 Nuovo et al. ............... 455/566
6,388,212 B1 * 5/2002 Ishihara et al. ............... 200/18
6,555,768 B2 * 4/2003 Deruginsky et al. ........... 200/4
6,810,265 B2 * 10/2004 Tochihara ................ 455/550.1
6,813,509 B2 * 11/2004 Aquilar et al. ........... 455/550.1
6,862,459 B2 * 3/2005 Sawada et al. .......... 455/550.1
2005/0181842 A1 * 8/2005 Yang ....................... 455/575.1
2005/0227726 A1 * 10/2005 Yang ....................... 455/550.1
2005/0275639 A1 * 12/2005 Yang .......................... 345/184

* cited by examiner

*Primary Examiner*—Charles Appiah
*Assistant Examiner*—Chuck Huynh
(74) *Attorney, Agent, or Firm*—Troxell Law Office, PLLC

(57) ABSTRACT

The present invention is a mobile device having an improved roller feel, comprising a hollow metal cylinder, a support and a plurality of terminals disposed firmly on the support. The hollow metal cylinder comprises a plurality of interference areas at an end of the hollow metal cylinder. The support comprises two braces. The terminals comprises a plurality of spring contacts, where the terminals are in contact with the inner surface of the hollow metal cylinder and at least one of the spring contacts stretches into the hollow metal cylinder in a depth not exceeding the scope of the interference areas. When rolling the hollow metal cylinder, the present invention makes the spring contacts create explicit and regular stress variations to produce a sense of feel. The interactions between the hollow metal cylinder and the spring contacts are enhanced and the sense of feel is more obvious; and the effect of durability is improved.

9 Claims, 6 Drawing Sheets

MOBILE DEVICE HAVING AN IMPROVED ROLLER FEEL

FIELD OF THE INVENTION

The present invention relates to a mobile device; more particularly, relates to that, when rolling the hollow metal cylinder, a mobile device produces explicit and regular stress variations between the terminals and the interference areas of the hollow metal cylinder so that the sense of feel is clearer and the effect of durability is improved.

DESCRIPTION OF THE RELATED ARTS

The technology of mobile communication has progressed a lot during the past years, so the role of roller construction is becoming increasingly important. Traditionally, the prior art as shown in FIG. 5 comprises a copper ring 4 with an insulated bushing around the outside. The copper ring 4 shaped as a hollow cylinder can be a conductor acting as an encoder which comprises a leaf spring 41 near the center being convex toward the hollow part of the copper ring 4. The copper ring 4 is propped up by two cantilevers 42,43 plugged into the hollow part where one of the cantilevers 42 comprises raised teeth 44 on the outward surface. When the copper ring 4 rolls, the leaf spring 41 of the copper ring 4 interferes with the raised teeth 44 of the cantilever 42 (stresses varying) so that the terminal is stirred and recovered to produce a sense of feel.

Although the structure mentioned above can produce a sense of feel by the leaf spring 41, the stress variations are not conspicuous so that the sense of feel is not clear. Besides, on using, the leaf spring 41 keeps interfering with the raised teeth 44 so that the leaf spring 41 made of metal will continuously make an effect of somewhat like ‘turning’ on the raised teeth 44. As a result, the interferences made between the leaf spring 41 and the raised teeth 44 are getting fewer and fewer so that the above structure of the prior art can only be used before long

SUMMARY OF THE INVENTION

The main purpose of the present invention is that, by improving the structure of the roller of the mobile device, the sense of feel can be clearer and the effect of durability is improved.

To achieve the above purpose, the present invention is a mobile device having an improved roller feel, comprising a hollow metal cylinder, a support and a plurality of terminals firmly disposed on the support. The hollow metal cylinder comprises a plurality of interference areas at an end thereof. The support comprises two braces. The terminals comprise spring contacts in contact with the inner surface of the hollow metal cylinder while some of the spring contacts stretch into the hollow metal cylinder in a depth not exceeding the region of the inner surfaces of the interference areas. By this structure, when rolling the hollow metal cylinder, explicit and regular stress variations are made between the terminals and the interference areas of the hollow metal cylinder to obtain a sense of feel.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

Figure 1:
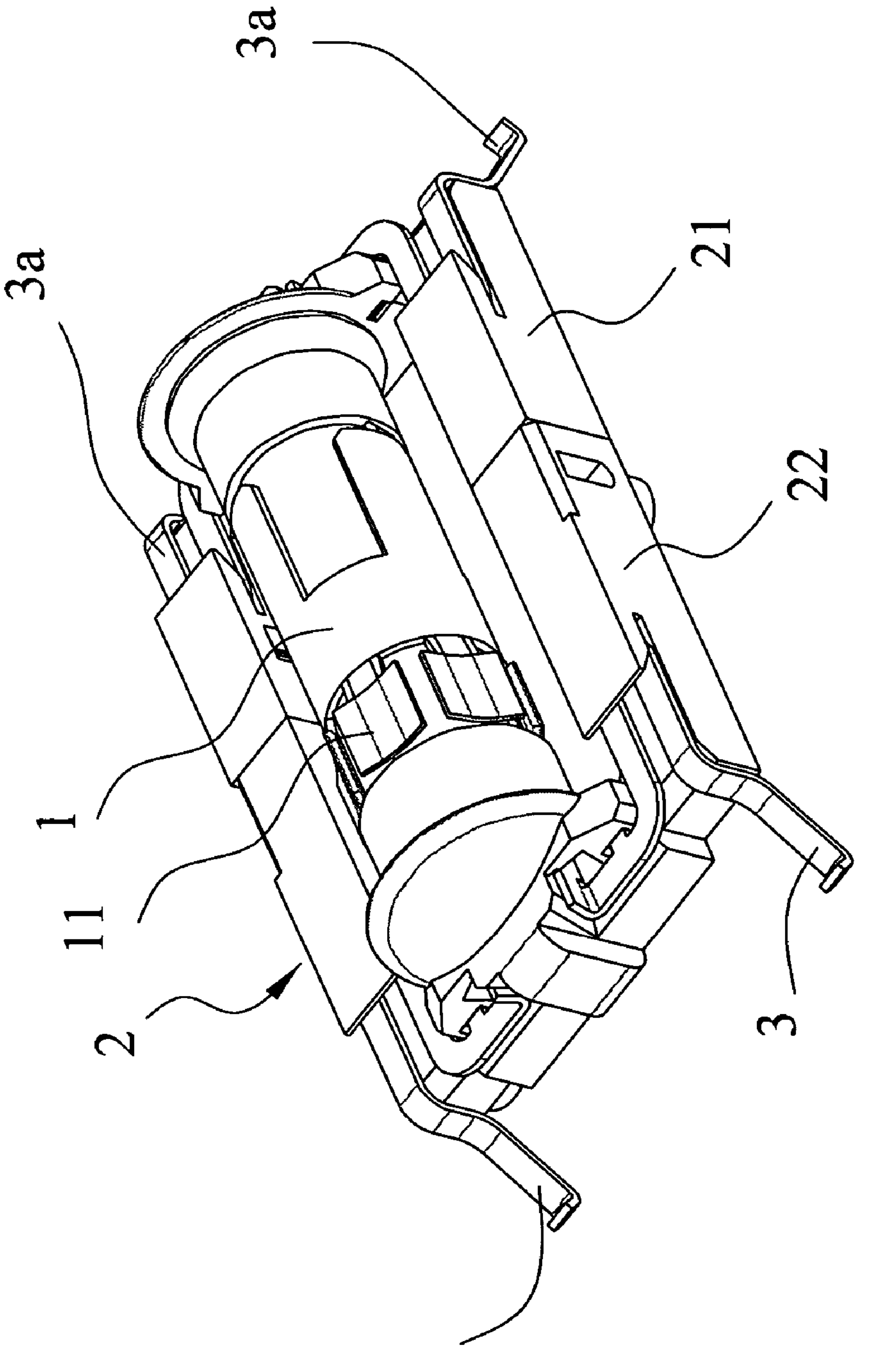
FIG. 1 is a perspective view according to the present invention.
Figure 2:
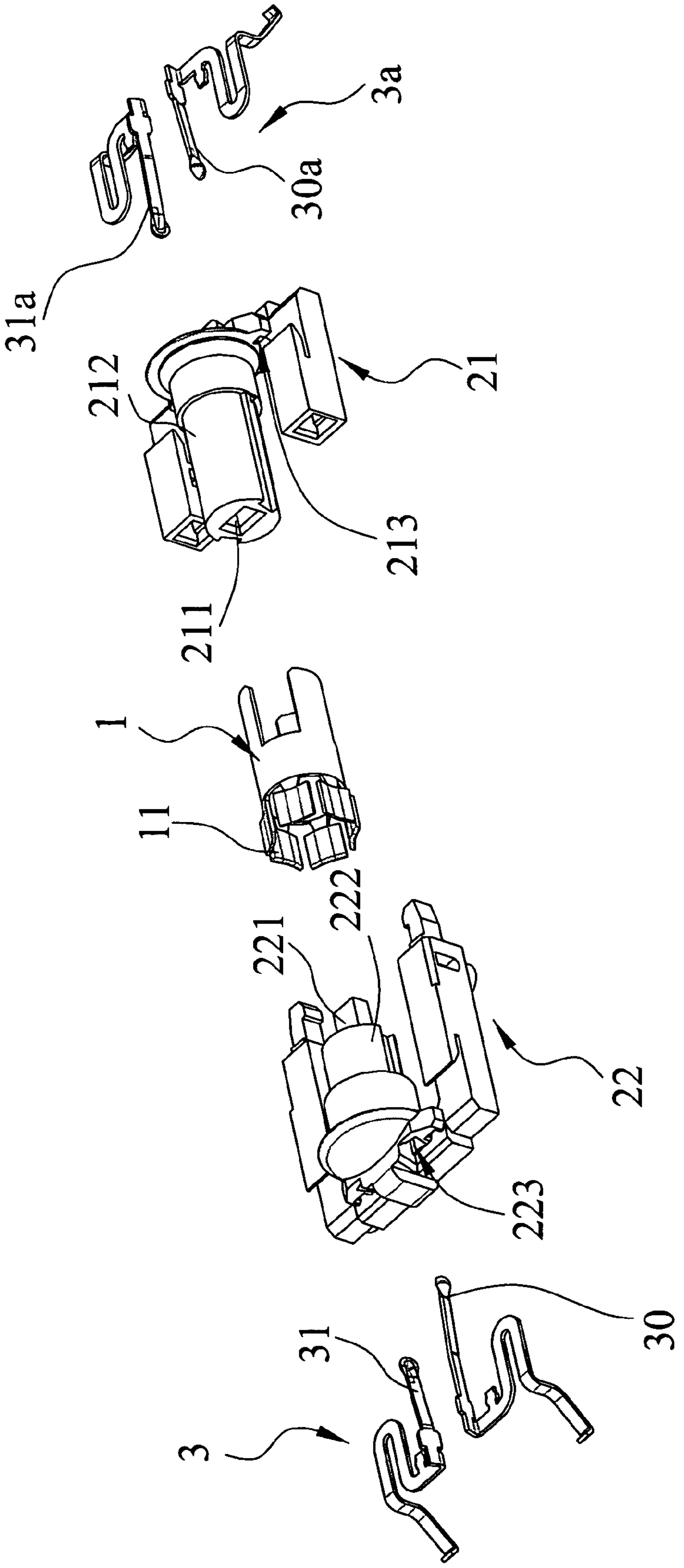
FIG. 2 is an exploded view of the structure according to the present invention.

The following descriptions of the preferred embodiments are provided to understand the features and the structures of the present invention.

Please refer to FIG. 1 through FIG. 4B, which are a perspective view, an exploded view showing the structure, a view of the contacting between the hollow metal cylinder and the terminals, a sectional view and another sectional view, according to the present invention. As shown in the figures, the present invention is a mobile device having an improved roller feel, comprising a hollow metal cylinder 1, a support 2 and a plurality of terminals 3,**3*a*, wherein the hollow metal cylinder 1 comprises interference areas 11 and the terminals 3,3*a* comprise spring contacts 30,31,30*a*,31*a*. On rolling the hollow metal cylinder 1, explicit and regular stress variations are made between the spring contacts and the interference areas 11 of the hollow metal cylinder 1 to create a sense of feel. And by the structure improvement, the interactions between the hollow metal cylinder 1 and the spring contacts of the terminals 3,3*a*** are enhanced so that a sense of feel is clear; and durability is achieved.

The hollow metal cylinder 1 mentioned above has a plurality of interference areas 11 at an end thereof, wherein the interference areas 11 can be inflection surfaces or flat surfaces whose shapes are different from the shape of the inner surface of the hollow metal cylinder 1.

The support 2 comprises two braces 21,22, wherein an end of one brace 22 comprises a fixture part 221 and an end of the other brace 21 comprises a fixture hole 211 to fix with the fixture part 221. The two braces 21,22, each with a cantilever 212,222, stretch into the hollow metal cylinder 1 from the two ends of the hollow metal cylinder 1, respectively; and the braces 21,22 comprise perforations 213,223 at two sides of an end thereof, respectively. The terminals 3,**3*a* are made of a metal, comprising spring contacts 30,31, 30*a*,31*a*. The spring contacts 30,31,30*a*,31*a* stretch into the hollow metal cylinder 1 from both ends of the hollow metal cylinder 1 to produce normal forces on the inner surface of the hollow metal cylinder 1 to butt with the hollow metal cylinder 1. The shorter spring contact 31 of the terminal 3 stretches into the inner surfaces of the interference areas 11 of the hollow metal cylinder 1 to produce a sense of feel. The spring contacts 30,31,30*a*,31*a* are put through the perforations 213,223 so that the terminals 3,3*a* are firmly disposed on the braces 21,22 by the spring contacts 30,31,30*a*,31*a* plugged in through the perforations 213,223. The terminals 3,3*a* are contacted with the inner surface of the hollow metal cylinder 1. So, on rolling the hollow metal cylinder 1, explicit and regular stress variations are made between the interference areas 11 and the spring contacts to produce a sense of feel. And the terminals 3,3***a* can transmit electrical signals.

The spring contacts 30,31 according to the present invention can also be of the same length so that all the spring contacts 30,31 are within the region of the inner surfaces of the interference areas 11 to enhance the sense of feel made by the terminals 3.

Figure 3:
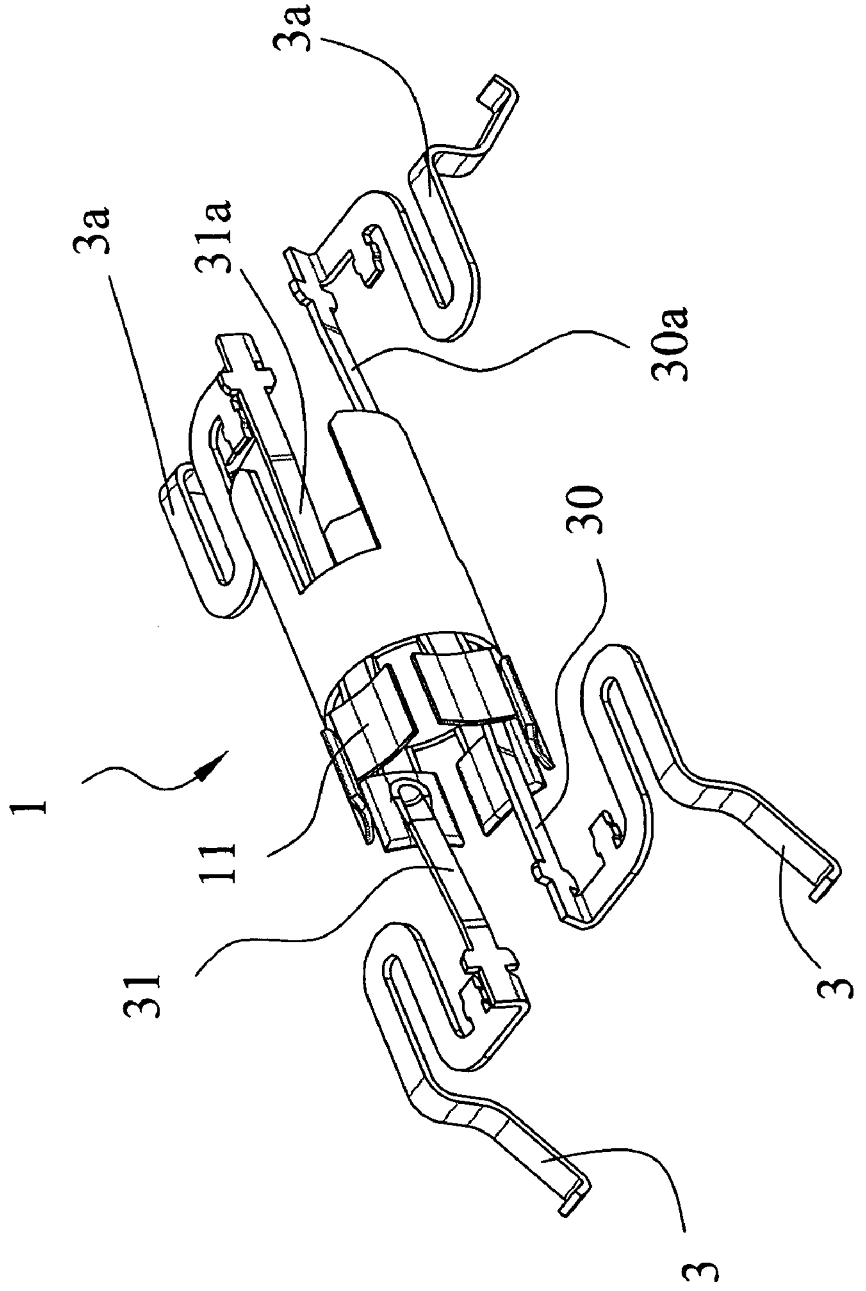
FIG. 3 is a view of the contacting between the hollow metal cylinder and the terminals according to the present invention.
Figure 4A:
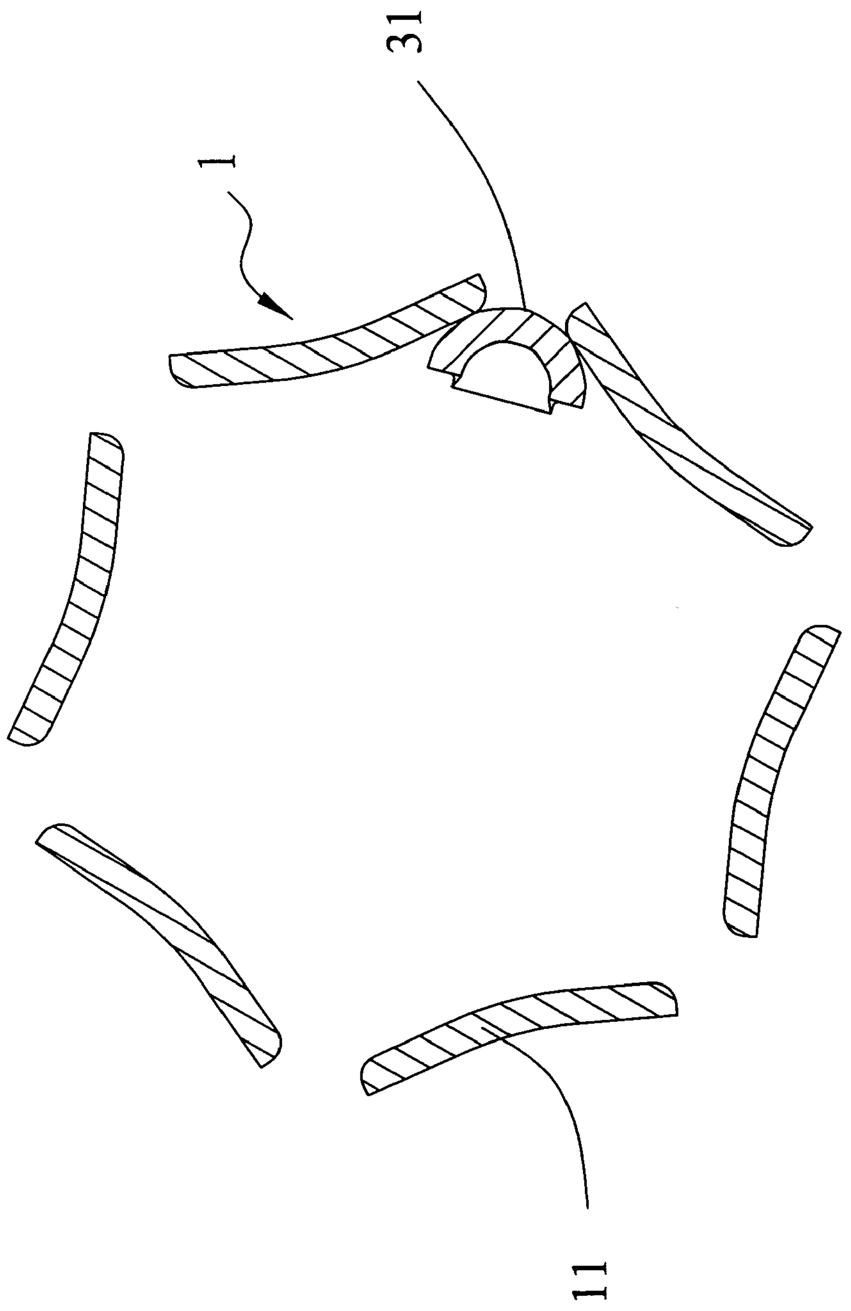
FIG. 4A is a sectional view showing a status of use according to the present invention.
Figure 4B:
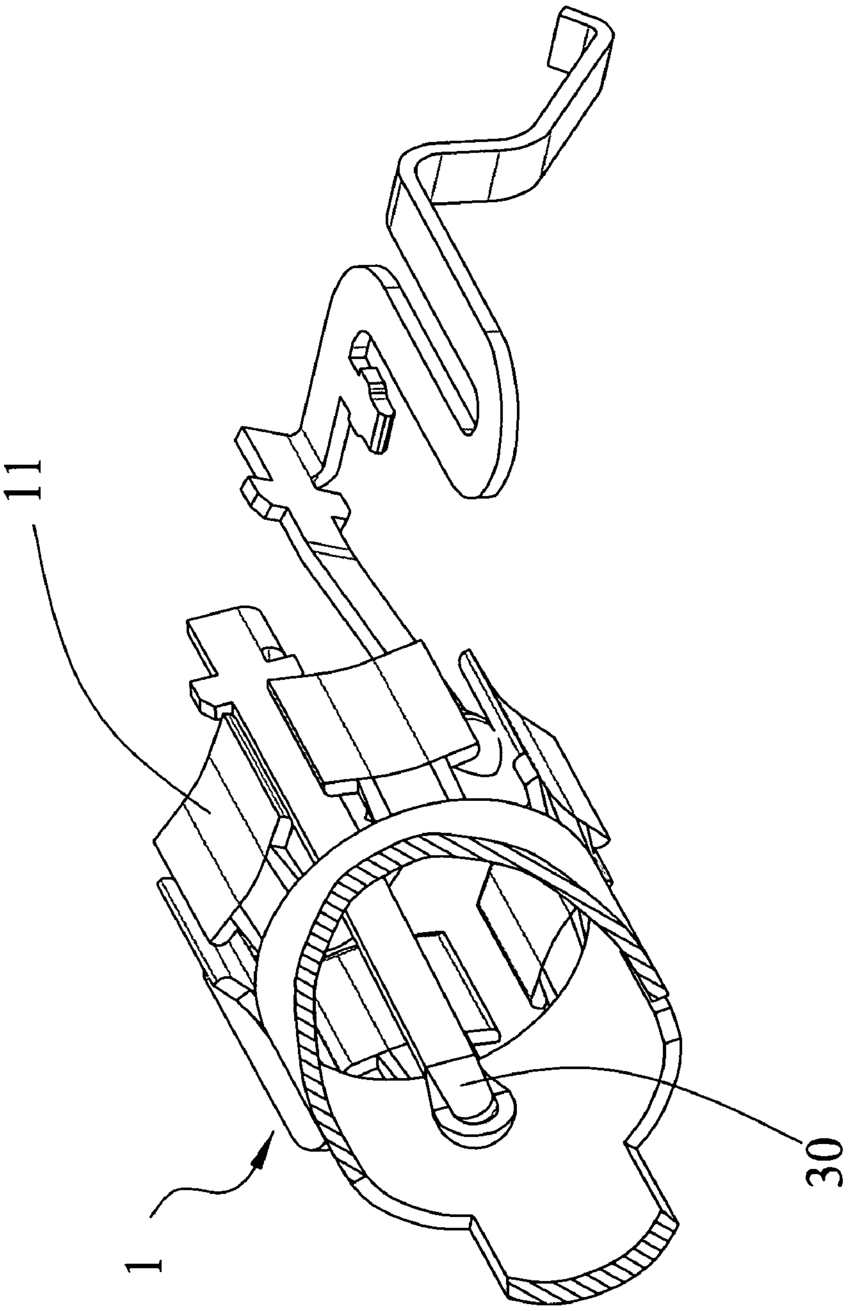
FIG. 4B is another sectional view showing a status of use according to the present invention.
Figure 5:
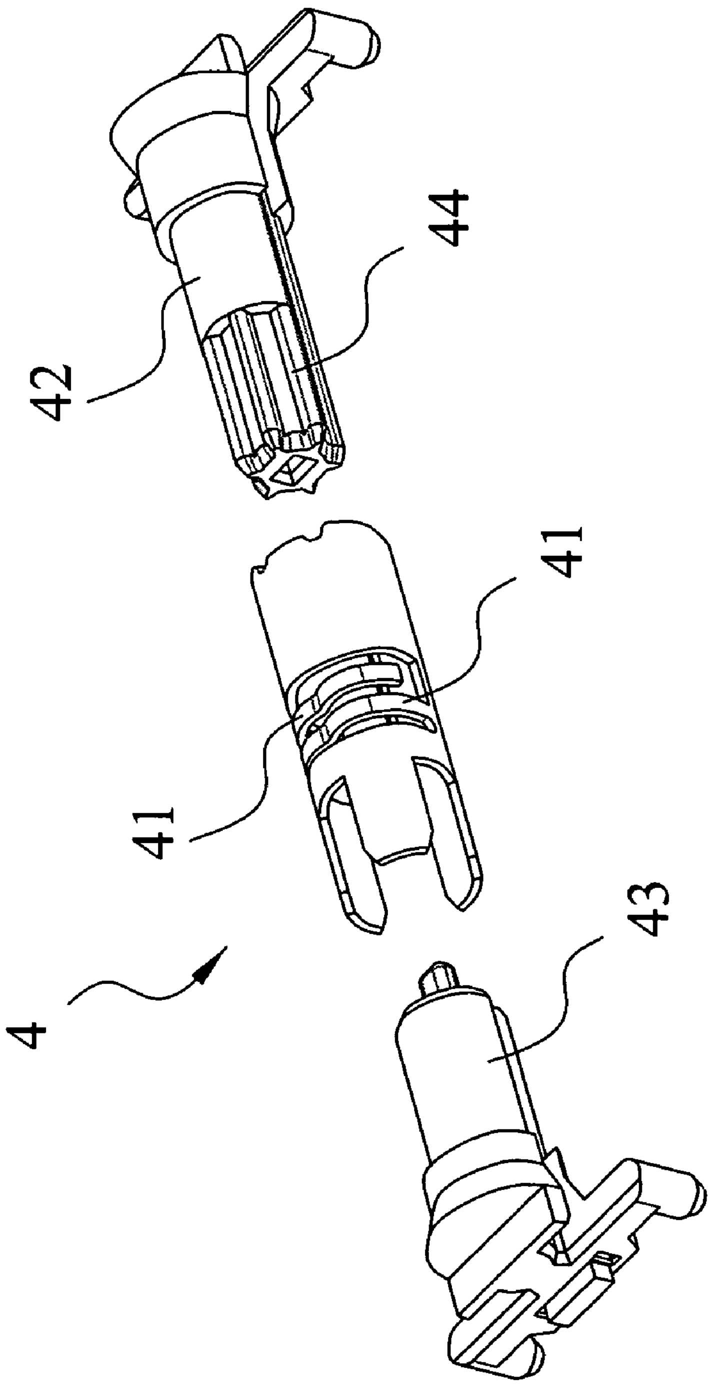
FIG. 5 (PRIOR ART)
FIG. 5 is an exploded view of the structure according to the prior art.

As shown in FIG. 3, FIG. 4A and FIG. 4B, a bushing (not shown in the figures) can be set around the outside of the hollow metal cylinder 1. When rolling the bushing, the hollow metal cylinder 1 follows. The butted interference areas 11 and the terminals 3 produce a phenomenon of stirring and recovering. Further on rolling the hollow metal cylinder 11, a sense of feel is produced by the spring contact 31 and the interference areas 11. Besides, the spring contacts 30,31,30*a*,31*a* are used to transmit the electrical signals of the mobile device. In order to enhance the sense of feel and to keep the spring contact 31 at some certain position when the hollow metal cylinder 1 stays, the inner inflection surfaces of the interference areas 11 can be used to make the spring contactor 31 of the terminals 3 stop at one of the concave parts within the inflection surfaces when the hollow metal cylinder 1 stops rolling.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A mobile device having an improved roller feel, comprising:

a hollow metal cylinder having a plurality of openings in an exterior surface with a plurality of interference areas located on said exterior surface of said hollow metal cylinder, wherein said interference areas are separately located in a position to have an underside partially overhanging said openings at an end of said hollow metal cylinder;

a support comprising two braces; and a plurality of terminals, comprising spring contacts, deposited on said support, stretching into two ends of said hollow metal cylinder to contact with an inner surface of said hollow metal cylinder, wherein at least one spring contact stretches into said hollow metal cylinder in a depth not exceeding a region of the inner surfaces of said interference areas.

2. The mobile device according to claim 1, wherein the shapes of the surfaces of said interference areas are different from the shape of the inner surface of said hollow metal cylinder.

3. The mobile device according to claim 1, wherein each of said interference areas comprises an inflection surface.

4. The mobile device according to claim 1, wherein each of said interference areas comprises a flat surface.

5. The mobile device according to claim 1, wherein an end of one said brace comprises a fixture part and an end of the other said brace comprises a fixture hole to fix with said fixtures part.

6. The mobile device according to claim 1, wherein both sides of an end of said braces comprise perforations for said terminals to put through to be deposited on said support.

7. The mobile device according to claim 1, wherein at least one said spring contactor is stretched into said hollow metal cylinder from an end of said hollow metal cylinder to produce a sense of feel.

8. The mobile device according to claim 1, wherein at least one said spring contactor is stretched into said hollow metal cylinder from an end of said hollow metal cylinder to transmit signals from a mobile device.

9. The mobile device according to claim 1, further comprising a spring contactor stop formed by two adjacent interference areas, said stop being located to be capable of said at least one said spring contactor temporarily shifting into said stop when rotation of the hollow metal cylinder ceases.

* * * * *